(12) United States Patent
Purnadi et al.

(10) Patent No.: US 9,232,532 B2
(45) Date of Patent: Jan. 5, 2016

(54) MITIGATING INTERFERENCE FROM WIRELESS EQUIPMENT

(71) Applicant: RESEARCH IN MOTION LIMITED, Waterloo (CA)

(72) Inventors: Rene Waraputra Purnadi, Irving, TX (US); Zhijun Cai, Euless, TX (US); Robert Mark Harrison, Grapevine, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 413 days.

(21) Appl. No.: 13/661,629

(22) Filed: Oct. 26, 2012

(65) Prior Publication Data

US 2014/0120967 A1    May 1, 2014

(51) Int. Cl.
*H04B 17/00* (2015.01)
*H04W 72/12* (2009.01)
*H04B 17/345* (2015.01)
*H04W 84/04* (2009.01)

(52) U.S. Cl.
CPC ......... *H04W 72/1226* (2013.01); *H04B 17/345* (2015.01); *H04W 72/1289* (2013.01); *H04W 84/045* (2013.01)

(58) Field of Classification Search
USPC ......... 455/450, 451, 452, 453, 454, 448, 449, 455/455, 67.11, 63.1, 67.13; 370/310–320
See application file for complete search history.

(56) References Cited

U.S. PATENT DOCUMENTS

| | | | |
|---|---|---|---|
| 2012/0275394 A1* | 11/2012 | Gunnarsson et al. | |
| 2013/0121191 A1* | 5/2013 | Song et al. | |
| 2013/0201966 A1* | 8/2013 | Weng et al. | |
| 2014/0056250 A1* | 2/2014 | Cattoni et al. | |
| 2014/0126523 A1* | 5/2014 | Gunnarsson et al. | |
| 2015/0063262 A1* | 3/2015 | Ji et al. | |

OTHER PUBLICATIONS

3GPP TR 03.024 V0.4.0 (Aug. 2012), Technical Report, 3rd Generation Partnership Project; Technical Specification Group Radio Access Project; Technical Specification Group Radio Access Network; Evolved Specification Universal Terrestrial Radio Access Network(E-UTRAN); Carrier-based NetNet ICIC use cases and solutions; Release 11; Aug. 2012 (22 pages).

(Continued)

*Primary Examiner* — Fayyaz Alam
(74) *Attorney, Agent, or Firm* — Trop Pruner & Hu, P.C.

(57) ABSTRACT

A first wireless access network node determines whether a first wireless equipment is potentially an interferer of wireless communication of a second wireless equipment in a domain of a second wireless access network node, where the first wireless equipment is in a domain of the first wireless access node. In response to determining that the first wireless equipment is potentially the interferer of the wireless communication of the second wireless equipment, configuration information is sent to the second wireless access network node to allow the second wireless access network node or the second wireless equipment to detect an interference from the first wireless equipment and to initiate performance of an interference mitigation procedure with respect to the interference from the first wireless equipment.

24 Claims, 8 Drawing Sheets

(56) References Cited

OTHER PUBLICATIONS

3GPP TSG-RAN WG3, Meeting #76, Agenda Item 12.1.1, Kyocera Corp., Ericsson; Prague, Czech Republic; May 21-25, 2012; Preamble-based solution for CA_HetNet_ICIC Macro-Pico UL interference scenario; R3-121189, May 21-25, 2012 (6 pages).
3GPP TSG-RAN WG1, Meeting # 60, San Francisco, U.S.A.;R1-101121; Agenda Item 8.2.2; Source: Motorola; "HeNB Interference Management," for discussion; San Francisco, U.S.A.; Feb. 22-26, 2010; (4 pages).
European Patent Office, PCT/ISA/206 Form and Communication relating to the results of the Partial International Search for PCT/US2013/066083, dated Feb. 24, 2014 (6 pages).
European Patent Office, Search Report and Written Opinion for PCT/US2013/066083, dated May 16, 2014 (15 pages).
3GPP TSG-RAN3 Meeting #76, R3-121453, Prague, Czech Republic, May 21-25, 2012, LS on UL Interference for CB ICIC (2 pages).
3GPP TS 36.331 V11.1.0 (Sep. 2012), Technical Specification, 3rd Generation Partnership Project; Technical Specification Group Radio Access Network; Evolved Universal Terrestrial Radio Access (E-UTRA); Radio Resource Control (RRC); Protocol specification (Release 11) (325 pages) Sep. 2012.
3GPP TS 36.321 V11.0.0 (Sep. 2012), Technical Specification, 3rd Generation Partnership Project; Technical Specification Group Radio Access Network; Evolved Universal Terrestrial Radio Access (E-UTRA); Medium Access Control (MAC) protocol specification (Release 11) (55 pages) Sep. 2012.
3GPP TS 36.300 V11.3.0 (Sep. 2012), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11) (205 pages) Sep. 2012.
3GPP TS 36.213 V11.0.0 (Sep. 2012), Technical Specification, 3rd Generation Partnership Project; Technical Specification Group Radio Access Network; Evolved Universal Terrestrial Radio Access (E-UTRA); Physical layer procedures (Release 11) (143 pages) Sep. 2012.
3GPP TS 36.211 V11.0.0 (Sep. 2012), Technical Specification, 3rd Generation Partnership Project; Technical Specification Group Radio Access Network; Evolved Universal Terrestrial Radio Access (E-UTRA); Physical Channels and Modulation (Release 11) (106 pages) Sep. 2012.
3GPP TR 03.024 V0.3.0 (May 2012), Technical Report, 3rd Generation Partnership Project; Technical Specification Group Radio Access Network; Evolved Universal Terrestrial Radio Access Network (E-UTRAN); Carrier-based HetNet ICIC use cases and solutions (Release 11) (19 pages) May 2012.

* cited by examiner

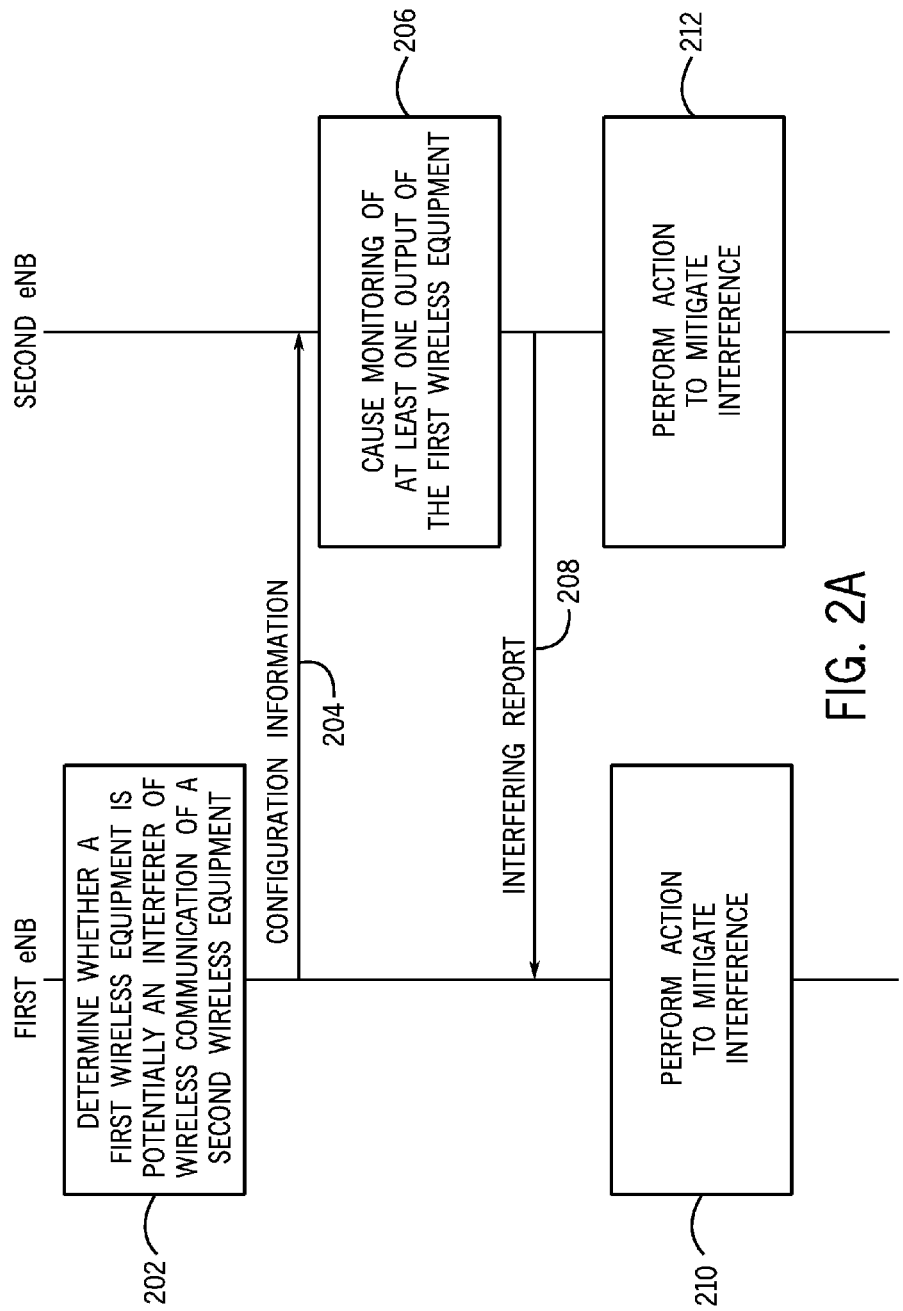

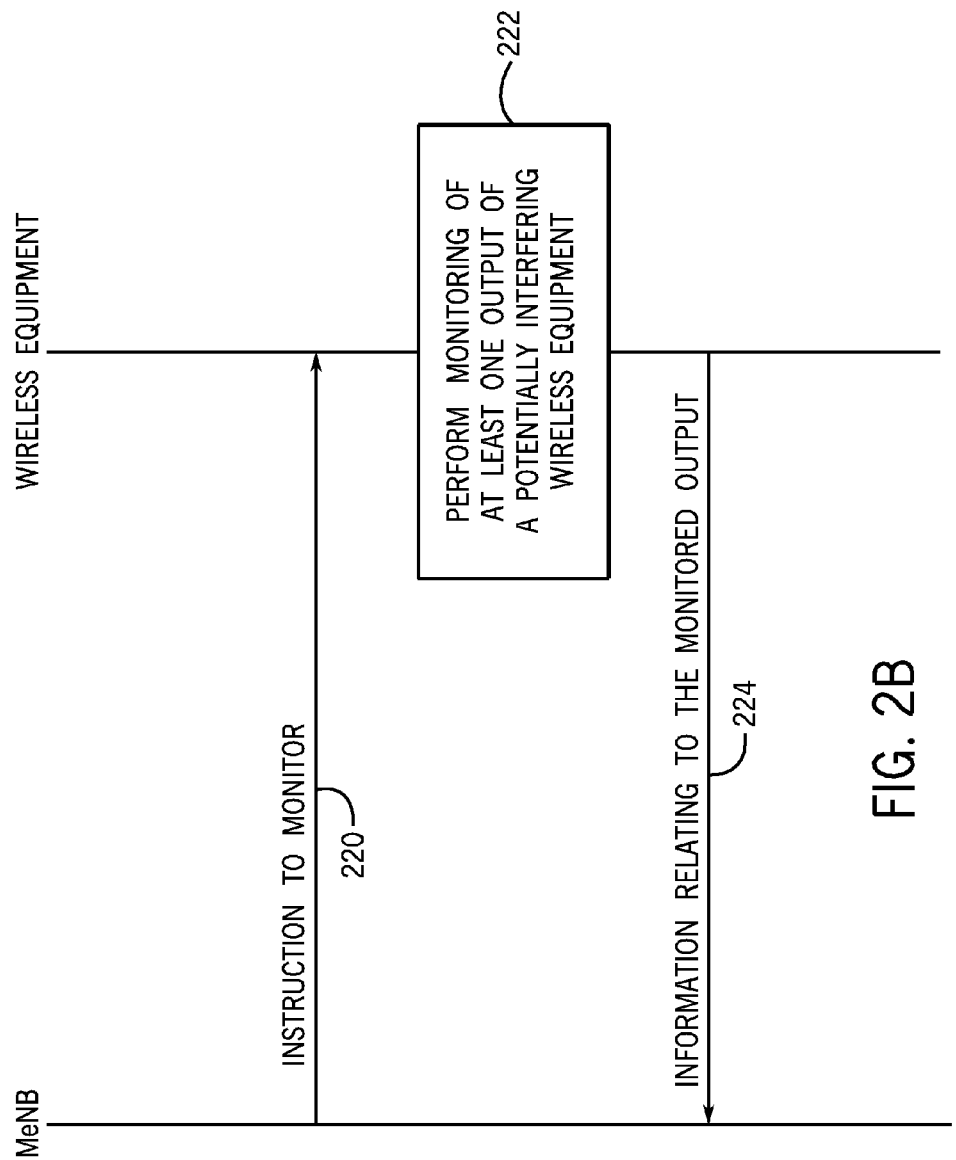

MITIGATING INTERFERENCE FROM WIRELESS EQUIPMENT

BACKGROUND

As the number of wireless user equipments has increased, wireless access service providers are increasingly facing challenges in meeting capacity demands in regions where the density of users is relatively high. To increase capacity, a wireless access service provider can deploy a heterogeneous network, which has multiple layers of cells. A first cell layer can be referred to as a macro cell layer, which includes macro cells. Another cell layer can include pico cells, which can be deployed within coverage areas of macro cells to complement the macro cells. Multiple pico cells can be deployed within a coverage area of a macro cell. Generally, a wireless access network node in a pico cell communicates uses lower-powered signaling as compared to a wireless access network node of a macro cell. Macro cells can transmit at powers such as 46 dBm (decibel-milliwatts), whereas pico cells can transmit at power such as 24 or 30 dBm.

In addition to a heterogeneous network deployment that can include multiple cell layers, some communications networks can also support device-to-device (D2D) communication between two or more user equipments. In D2D communication, two or more user equipments in relatively close proximity with each other can communicate directly with each other instead of through a wireless access network node. In some cases, user equipments communicating directly, by employing D2D connectivity, may achieve better performance than communications that have to pass through a wireless access network node. D2D communications can be used to support various applications, including video streaming, online gaming, peer-to-peer file sharing, and so forth.

Some communications networks can also implement relaying, where a relay node can be used to re-transmit a wireless signal to enhance transmissions of user equipments in certain scenarios. For example, at the edge of a cell, a wireless link between a user equipment and a wireless access network node can be relatively weak. In such locations, a user equipment's uplink transmission can be received by a relay node, which can relay (forward) the uplink transmission to a wireless access network node.

BRIEF DESCRIPTION OF THE DRAWINGS

Some embodiments are described with respect to the following figures:

FIG. 2A is a message flow diagram of a process of interference mitigation, in accordance with some implementations;

FIG. 2B is a message flow diagram of a process to instruct monitoring of at least one output of a potentially interfering wireless equipment, in accordance with some implementations;

DETAILED DESCRIPTION

Figure 1A:
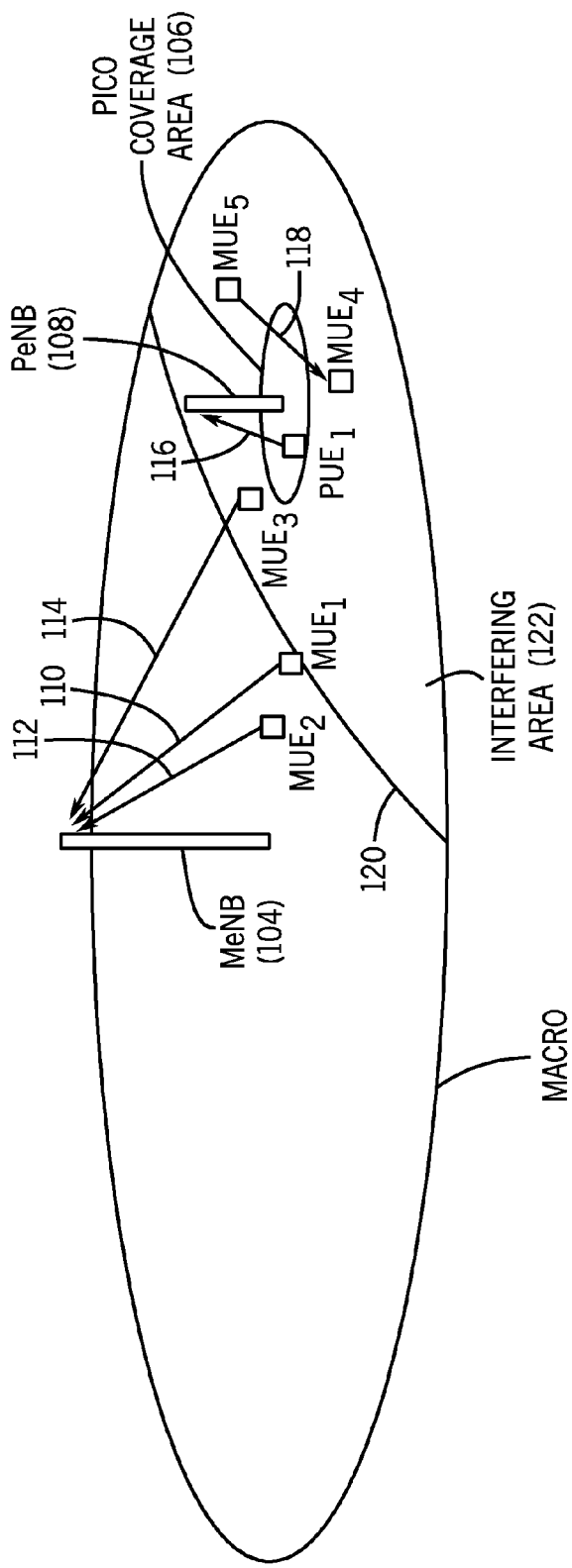
FIGS. 1A and 1B are schematic diagrams of portions of example communications networks in which uplink interference can occur.

A communications network can include various different types of wireless equipments. For example, if the communications network implements a heterogeneous network, then there can be macro user equipments (MUEs) that can communicate with respective macro wireless access network nodes that are part of macro cells. The heterogeneous network can also include pico UEs (PUEs) that can communicate with pico wireless access network nodes that support pico cells. Note that a given UE is considered an MUE when in a domain of a macro wireless access network node, and is considered a PUE when in a domain of a pico wireless access network node. A UE is in the domain of a particular wireless access network node (macro or pico wireless access network node) when control signaling associated with wireless communications is communicated between the particular wireless access network node and the UE. Stated differently, a UE is in the domain of the particular wireless access network node when the particular wireless access network node serves the UE.

In the ensuing discussion, although reference is made to a heterogeneous network that has two layers of cells (macro cells and pico cells), it is noted that techniques or mechanisms according to some implementations can also be applied to a heterogeneous network that has more than two layers of cells.

A UE can refer to any electronic device that is capable of performing wireless communications. Examples of UEs include mobile telephones, smartphones, personal digital assistants (PDAs), tablet computers, notebook computers, game appliances, and so forth.

Other types of wireless equipments that may be deployed in a communications network include relay nodes that are able to relay communications of UEs to wireless access network nodes (which can be referred to as donor wireless access network nodes in the relaying context). A relay node can be a mobile relay node or a fixed relay node. A fixed relay node is generally fixed at a particular location, whereas a mobile relay node can move to different locations. Note that in some examples, a relay node can be a UE, which can be an example of a mobile relay node. A relay node can also be implemented at a repeater fixed at a particular location, which would be an example of a fixed relay node. In the ensuing discussion, a "relay node" can refer to either a mobile relay node or a fixed relay node.

A communications network may also support device-to-device (D2D) communications between two or more UEs. In D2D communication, the UEs communicate directly with each other without passing bearer traffic through any wireless access network node.

It is noted that D2D UEs and relay nodes are also in the domain of (served by) respective wireless access network nodes. The wireless access network nodes that serve the UEs involved in D2D communication control the D2D communication, In the ensuing discussion, a wireless equipment can refer to any of the following: a UE that transmits to a serving wireless access network node, a relay node, and a D2D UE. Also, a wireless equipment can also refer to a wireless access network node that serves a UE or relay node.

The deployment of a heterogeneous network, relay nodes, and D2D communications can be supported by the Long-Term Evolution Advanced (LTE-A) standards as provided by the Third Generation Partnership Project (3GPP). The LTE standards are also referred to as the Evolved Universal Terrestrial Radio Access (E-UTRA) standards. Although reference is made to LTE in the ensuing discussion, it is noted that techniques or mechanisms according to some implementations can be applied to other wireless access technologies.

In an LTE network, a wireless access network node can be implemented as an enhanced Node B (eNB). In the ensuing discussion, reference is made to eNBs. However, it is noted that if other wireless access technologies are used, other types of wireless access network nodes would be provided. In a heterogeneous network, a macro eNB (MeNB) supports communications in a macro cell, whereas a pico eNB (PeNB) supports communication in a pico cell.

Interference may occur as a result of transmissions by the different wireless equipments in a communications network. Generally, a transmission by a first wireless equipment (e.g. UE or relay node) that is in a domain of a first wireless access network node may interfere with a transmission of a second wireless equipment (UE or relay node) that is in a domain of a second, different wireless access network node. In some examples, it is assumed that the uplink resource allocations for wireless equipments within the domain of the same serving wireless access network node are internally coordinated by the serving wireless access network node such that interference among the transmissions of such wireless equipments served by the same serving wireless access network node should not happen.

Example Interference Scenarios

Various example scenarios where interference may occur are provided below.

A macro UE (MUE) can perform uplink transmission to an MeNB. This uplink transmission of the MUE may interfere with the uplink transmission of a pico UE (PUE) to a PeNB. In this example, note that the MUE is in the domain of the MeNB, while the PUE is in the domain of the PeNB.

In the context of D2D communications, the D2D transmission of a transmitting MUE to a recipient MUE may interfere with the uplink transmission of a PUE to a PeNB (assuming the D2D transmission occurs in the uplink frequency band of the PUE to PeNB transmission). Also, it is possible that the uplink transmission of a PUE to a PeNB may interfere with the D2D transmission of a transmitting MUE to a recipient MUE (assuming the D2D transmission occurs in the uplink frequency band of the PUE to PeNB transmission). In these examples, the D2D MUEs are in the domain of a serving MeNB, while the PUE is in the domain of a PeNB.

As a further example, the uplink transmission of a relay node (mobile relay node or fixed relay node) to a donor MeNB can interfere with the uplink transmission of a PUE to a PeNB. Similarly, the uplink transmission of an MUE to a relay node (mobile relay node or fixed relay node) may interfere with the uplink transmission of the PUE to the PeNB.

Additionally, the uplink transmission of the PUE to the PeNB may interfere with the uplink transmission of an MUE to a relay node.

The above interference scenarios involve interference of a transmission of a first wireless equipment in an MeNB domain with transmission of a second wireless equipment in a PeNB domain, or vice versa.

Note that other interference scenarios can involve interference of a transmission of a first wireless equipment in the domain of a first MeNB with a transmission of a second wireless equipment in the domain of a second, different MeNB. Examples of such interference scenarios include:

a transmission of an MUE to a relay node served by a first MeNB interferes with a transmission of an MUE to a relay node or a transmission of a D2D transmitting MUE to a D2D recipient MUE served by a second, different MeNB;

a D2D transmission of a transmitting MUE to a recipient MUE served by a first MeNB interferes with a transmission of an MUE to a relay node or a transmission of a D2D transmitting MUE to a D2D recipient MUE served by a second, different MeNB;

an uplink transmission of a relay node to a first MeNB interferes with a transmission of an MUE to a relay node or a transmission to a D2D recipient MUE served by a second, different MeNB.

Further interference scenarios can involve interference of a transmission of a first wireless equipment in the domain of a first PeNB with a transmission of a second wireless equipment in the domain of a second, different PeNB. For example, an uplink transmission of a first PUE to a first PeNB can interfere with the uplink transmission of a second PUE to a second PeNB.

Another example interference scenario can involve the uplink transmission of a MUE in the domain of first MeNB or PUE in the domain of first PeNB interfering with a sensor provided at a relay node in the domain of second MeNB or second PeNB. The sensor at the relay node is used to detect an uplink transmission of an MUE.

FIG. 1A is a schematic diagram of a portion of a communications network to illustrate potential interference between difference wireless entities. FIG. 1A shows a macro coverage area 102, which is the coverage area of a macro cell supported by an MeNB 104. FIG. 1A also shows a pico coverage area 106, which is the coverage area of a pico cell supported by a PeNB 108.

In the example of FIG. 1A, three MUEs ($MUE_1$, $MUE_2$, and $MUE_3$) perform respective uplink transmissions 110, 112, and 114 to the MeNB 104. A PUE ($PUE_1$) performs uplink transmission 116 to the PeNB 108. Two D2D MUEs ($MUE_4$ and $MUE_5$) are able to perform D2D communication over a transmission 118 ($MUE_5$ transmits to $MUE_4$) in the domain of MeNB 104.

A boundary represented as 120 defines a region 122 within the macro coverage area 102 that includes the pico coverage area 106. The region 122 is considered an interfering area, since an MUE that is at the boundary 120 or within the region 122 and that performs an uplink transmission to the MeNB 104 may potentially interfere with the uplink transmission 116 of a PUE to the PeNB 108. In the example of FIG. 1A, since $MUE_2$ is outside the region 122, the uplink transmission 112 from $MUE_2$ to the MeNB 104 does not cause interference with the uplink transmission 116 of $PUE_1$. On the other hand, since $MUE_1$ is at the boundary 120, and $MUE_3$ is within the region 122, the uplink transmissions 110 and 114 from $MUE_1$ and $MUE_3$, respectively, can cause interference with the uplink transmission 116 of $PUE_1$ to the PeNB 108.

The transmission power in an uplink transmission of an MUE to the MeNB 104 is strong enough to compensate for propagation signal loss, shadowing, fading, and so forth, such that the MeNB 104 can correctly decode the data in the uplink transmission. Depending on the position of the MUE, this uplink transmission from the MUE can reach a PeNB. In fact, in some cases, the uplink transmission from the MUE to the MeNB 104 may reach the PeNB 108 with stronger power than the MeNB 104, particularly when the MUE is closer to the PeNB 108 and the MeNB 104. An example of such an MUE is $MUE_3$ in FIG. 1A.

When the uplink transmission of the MUE to the MeNB 104 collides with the uplink resources that have been reserved by the PeNB 108 for a served PUE (PUE$_1$), uplink interference can occur.

In addition, the D2D communication over transmission 118 between MUE$_4$ and MUE$_5$ can cause interference with the uplink transmission 116 from PUE$_1$ to the PeNB 108. In D2D communications, the transmitting MUE can transmit with power that is strong enough to allow the receiving MUE(s) to correctly decode the transmitted data. Such D2D transmission can reach a nearby PeNB 108. In some cases, the D2D transmission power as received by the PeNB 108 may be stronger than the intended recipient MUE(s). When the D2D transmission collides with the uplink resources reserved for a PUE by the PeNB, uplink interference can occur.

In some cases, it is possible for certain control messages, such as ACK/NACK (acknowledge/no acknowledge), to be sent from a D2D MUE via the MeNB 104 to allow for proper resource allocation for a transmitting MUE in a D2D communication. The transmission of such control information via the MeNB 104 can further create uplink interference to the uplink transmission 118 of a PUE$_1$ to the PeNB.

Similarly, the uplink transmission 116 from PUE$_1$ to the PeNB 108 can cause interference with the D2D transmission 118 between MUE$_4$ and MUE$_5$, if the D2D transmission 118 uses the same resources in the frequency band of the uplink transmission 116 from PUE$_1$ to the PeNB 108.

Although not shown in FIG. 1A, interference associated with communications of relay nodes can also occur.

Procedure Relating to Identification of Interfering Equipment and Interfered Equipment In accordance with some implementations, techniques or mechanisms are provided to mitigate interference caused by wireless transmissions in the various interference scenarios mentioned above, as well as in other interference scenarios.

FIG. 2A is a message flow diagram of a process for mitigating interference in accordance with some implementations. A first eNB determines (at 202) whether a first wireless equipment (in the domain of the first eNB) is potentially an interferer of wireless communication of a second wireless equipment in a domain of a second eNB. Such determination allows for the identification of a potentially interfering equipment (UE or relay node) with a potentially interfered equipment (UE, relay node, eNB, or sensor). Determining whether the first wireless equipment is potentially an interferer of wireless communication of a second wireless equipment can be based on one or more factors. In some implementations, such determining can be based on a distance factor, such as whether the first wireless equipment is in a predefined proximity to the second eNB or to the second wireless equipment. In other words, the first wireless equipment is determined to be potentially an interferer if the first wireless equipment is within some specified distance to the second wireless equipment or to the second eNB. If the first wireless equipment is relatively far away from the second wireless equipment or the second eNB, then it is unlikely that a transmission of the first wireless equipment would cause interference with the transmission of the second wireless equipment.

In the example of FIG. 1A, MUE$_1$ or MUE$_3$ would be in the predefined proximity to the PeNB 108. However, MUE$_2$ is not in the predefined proximity of the PeNB 108. Similarly, the first UE may be PUE$_1$ that may be in the predefined proximity to MUE$_5$ that is involved in the D2D transmission 118. As a further alternative, MUE$_4$ that is involved in the D2D transmission 118 may be in the predefined proximity to the PeNB 108. A similar issue can exist with a relay node, when a PUE that is potentially an interferer can be in the predefined proximity to a relay node, or a relay node transmitting to a donor MeNB or MUE communicating to a relay node is in the predefined proximity to the PeNB 108. Further examples of predefined proximity are also possible in the other interference scenarios discussed above.

Figure 1B:
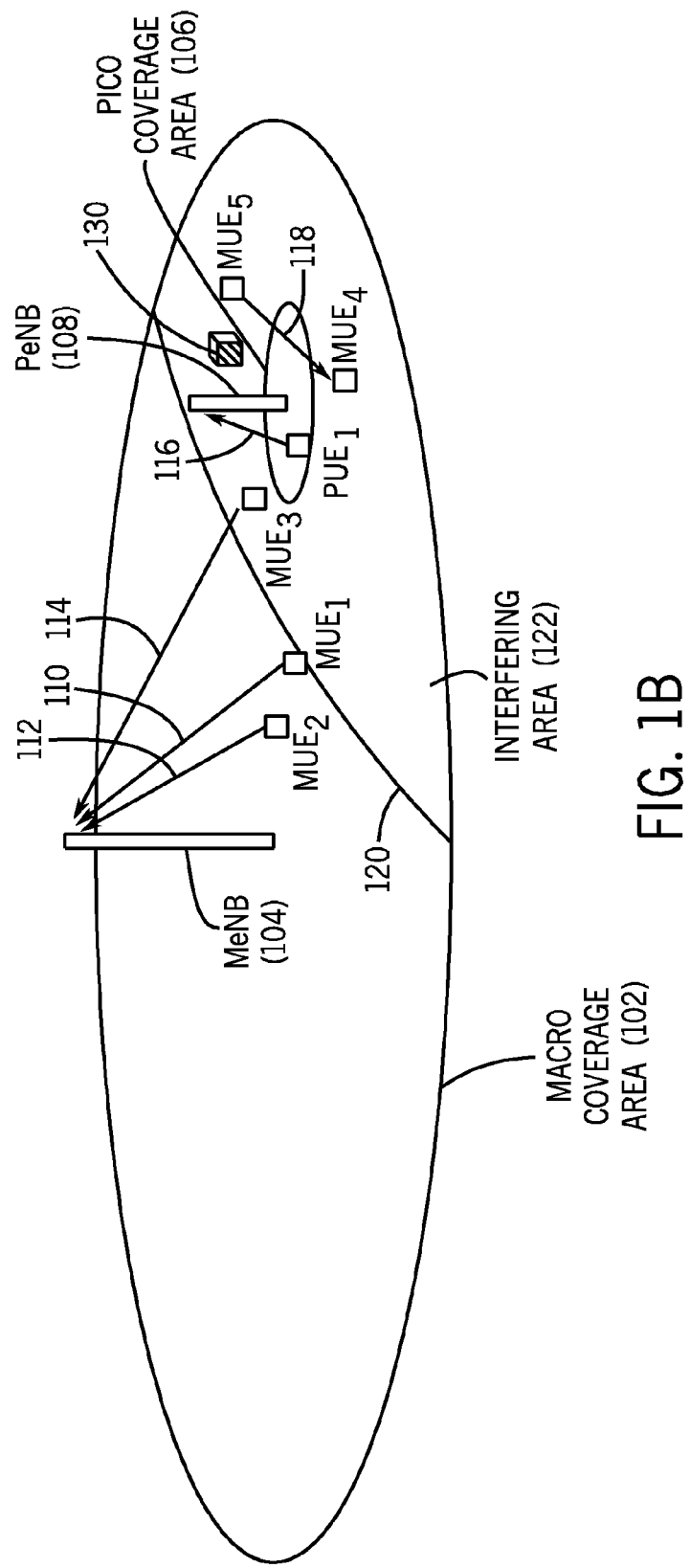

The determination of whether or not the first UE is potentially an interferer of wireless communication of the second equipment can also be based on a determination of whether an obstacle is present that would prevent the interference by the first equipment of wireless communication of the second equipment. For example, FIG. 1B depicts an obstacle 130, which can be in the form of a building. The presence of the obstacle 130 prevents the D2D transmission between MUE$_4$ and MUE$_5$ from interfering with the uplink transmission 116 of PUE$_1$. Similarly, the presence of the obstacle 130 may prevent interference by the uplink transmission 116 from PUE$_1$ to the PeNB 108 with the D2D transmission received by MUE$_5$.

The task 202 of FIG. 2A allows for the recognition of a potential interferer entity and a potential interfered entity. In response to determining (at 202) that the first wireless equipment is potentially the interferer of the wireless communication of the second wireless equipment, the first eNB sends (at 204) configuration information to the second eNB to allow the second eNB to detect an interference from the first equipment and to initiate performance of an interference mitigation procedure with respect to the interference from the first wireless equipment.

The configuration information can refer to information relating to at least one control signaling characteristic of certain control signaling transmitted by a wireless equipment. An example of the control signaling characteristic can include a format of a given control signal. Another example of the control signaling characteristic can include a signature or pattern of a given control signal. A further example of the control signaling characteristic can include a type of the information conveyed by the control signaling, such as whether the control signaling carries CSI (channel state information), an SR (scheduling request), or an RS (reference signal). More specific examples of configuration information can include information pertaining to the following: a PUCCH (physical uplink control channel) format 1, 2, 2a, 2b, or 3 configuration, a non-contention RACH (random access channel) preamble signature, an SRS (sounding reference signal) configuration, and a DMRS (demodulation reference signal) pattern.

In response to the configuration information, the second eNB causes (at 206) monitoring of at least one output of the first wireless equipment to determine whether the first equipment is an interferer with wireless communication of the second wireless equipment. Task 206 can involve the second eNB performing the monitoring of the at least one output of the first wireless equipment.

Alternatively, task 206 can involve the following process, as shown in FIG. 2B. If the second eNB is an MeNB that supports D2D communications and relay nodes, the MeNB can send (at 220) an instruction to monitor to a particular wireless equipment, which can be a D2D MUE or a relay node to monitor the at least one output of the first wireless equipment. In response to the instruction, the D2D MUE or relay node performs (at 222) the instructed monitoring of the at least one output of the potentially interfering wireless equipment, and sends (at 224) information relating to the monitored at least one output to the MeNB. From the information relating to the monitored at least one output, the MeNB can determine whether or not the first wireless equipment is an interferer.

Referring again to FIG. 2A, in response to determining that the first wireless equipment is an interferer with the wireless communication of the second wireless equipment, the second eNB sends (at 208) an interfering report to the first wireless eNB. The interfering report can provide an indication that the first wireless equipment is an interferer, and can include further information (discussed in further detail below). The first eNB or the second eNB, or both, can then perform (at 210 and 212, respectively) a corresponding action to mitigate interference caused by the first wireless equipment. Further details regarding various different types of interference mitigation solutions that can be applied by the first eNB or second eNB, or both, are discussed further below.

In some examples, an MeNB and an PeNB can share information (including the information sent at 204 and 208) through an X2 interface. Additionally, two MeNBs or two PeNBs can also share information through an X2 interface.

Also, it can be assumed that for D2D and relay operations of MUEs, a serving MeNB controls the uplink resource scheduling and UE specific configuration of a UE. Uplink resource scheduling refers to scheduling of resources on the uplink (from the MUE to the MeNB, from the MUE to the relay node, from the relay node to the donor MeNB and from the D2D transmitting MUE to the D2D recipient MUE) for communication of control and bearer data. Examples of UE specific configurations include the following: a PUCCH (physical uplink control channel) format configuration, a non-contention RACH (random access channel) preamble signature, a SRS (sounding reference signal) configuration, and a DMRS (demodulation reference signal) pattern. A message that can be used to carry any of the UE specific configurations (such as from the first eNB to the second eNB at 204 in FIG. 2A) can be a new X2AP message referred to as "UE Configuration Notify."

For improved efficiency, the UE specific configuration is not shared by an MeNB with all PeNBs, but rather just with the PeNB that may be a subject of interference (such as due to the PeNB being in the predefined proximity with a potentially interfering wireless equipment). If a wireless equipment (including an MUE that transmits to an MeNB, a transmitting D2D MUE, a relay node, or an MUE that transmits to a relay node) is in the predefined proximity to the PeNB, the serving MeNB can share the wireless equipment specific configuration with the non-serving PeNB. Similarly, if a potentially interfering PUE is in the predefined proximity to a recipient D2D MUE or a relay node, the serving PeNB shares the PUE specific configuration to the non-serving MeNB to be further shared to the recipient D2D MUE or the relay node. The sharing of a UE specific configuration can also be triggered in any of the further interference scenarios discussed further above.

For determining whether a potentially interfering wireless equipment is in a predefined proximity with a potentially interfered wireless equipment (a UE, relay node, eNB, etc.), the eNBs can obtain up to date location information of each other, such as by using X2 Setup request/response messages or Operations, Administration, and Maintenance (OAM) messages. Also, a serving MeNB knows the location of its served wireless equipment (including an MUE that performs uplink transmission with the serving MeNB, a D2D MUE, an MUE that performs uplink transmission to a relay node, or a relay node). Similarly, a serving PeNB knows the location of its served PUE.

In alternative examples, the proximity of a potentially interfering wireless equipment with a potentially interfered wireless equipment can be determined by the measurement reports sent from the potentially interfering wireless equipment. For example, when an MUE transmits measurement reports to the MeNB (where a measurement report contains one or more various measured parameters as measured by the MUE), the MeNB can determine that the MUE may be in the proximity of one or multiple PeNB, such as based on a reported Reference Signal Received Power (RSRP) value or Reference Signal Received Quality (RSRQ) value. RSRP is an average power of a downlink reference signal. RSRQ provides an indication of signal quality, and is based on a ratio of RSRP to a carrier received signal strength indicator (RSSI) (which represents received power).

Using the measurement reports, the MeNB can potentially recognize the potential interferers for a particular PeNB. In some implementations, the MeNB can directly use the measurement report information for interference mitigation. In other implementations, the MeNB can send a "UE Configuration Notify" to a potentially interfered PeNB for further measurement of certain uplink transmitted information for detecting whether a potentially interfering wireless equipment is in fact causing interference. As discussed further below, examples of uplink transmitted information that can be monitored by a PeNB can include a scheduling request (SR), channel state information (CSI), a quality channel indicator (CQI), a sounding reference signal (SRS), a random access channel (RACH), or a demodulation reference signal (DMRS).

For example, when a wireless equipment specific configuration of a potentially interfering equipment served by an MeNB is received by a PeNB, the PeNB can start monitoring any of the foregoing uplink transmitted information of the potentially interfering wireless equipment to evaluate potential uplink interference. If the potentially interfering wireless equipment does in fact cause uplink interference, an interference mitigation procedure can be initiated Similarly, when a PUE specific configuration is received by MeNB, the MeNB shares this PUE configuration, through a new Radio Resource Control (RRC) UE Configuration Notify message, to the potentially interfered wireless equipment served by the MeNB (D2D MUE, a relay node, or a sensor in a relay node) that is in a predefined proximity to the PUE location. This RRC UE Configuration Notify message causes the potentially interfered wireless equipment served by the MeNB to start monitoring the SR (or CQI or RACH or SRS or DMRS) of the PUE to evaluate potential uplink interference. If the PUE does in fact cause uplink interference, an interference mitigation procedure can be initiated.

The foregoing techniques can be applied to other interference scenarios as well.

In some cases, neighboring PeNBs may not interact with one another. When an MeNB observes that PUEs of two respectively close serving PeNBs may interfere with each other, the MeNB may share the PUE specific configuration of a potentially interfering PUE served by a first PeNB with a second PeNB that serves a potentially interfered PUE, so that the second PeNB can start monitoring the SR (or CQI or CSI or RACH or SRS or DMRS) of the potentially interfering PUE. Alternatively, the MeNB may trigger the first and second PeNBs to share their PUE specific configuration information. These PeNBs can establish X2 connection for sharing the information. This allows a potentially interfered PeNB to cause monitoring of uplink transmitted information to determine whether a potentially interfering PUE (served by the first PeNB) is in fact interfering with the uplink transmission from the potentially interfered PUE served by the second PeNB.

In addition, two MeNBs can also share MUE specific configuration information with each other, also over an X2 interface. This allows a potentially interfered MeNB to cause monitoring of uplink transmitted information to determine whether a potentially interfering MUE (served by a first MeNB) is in fact interfering with the uplink transmission from a second MUE served by the potentially interfered second MeNB.

To compensate for any delay in X2 communications between eNBs, information relating to a time gap can be added in a UE Configuration Notify message to indicate when the monitoring of uplink transmitted information from the potentially interfering should start.

Figure 3:
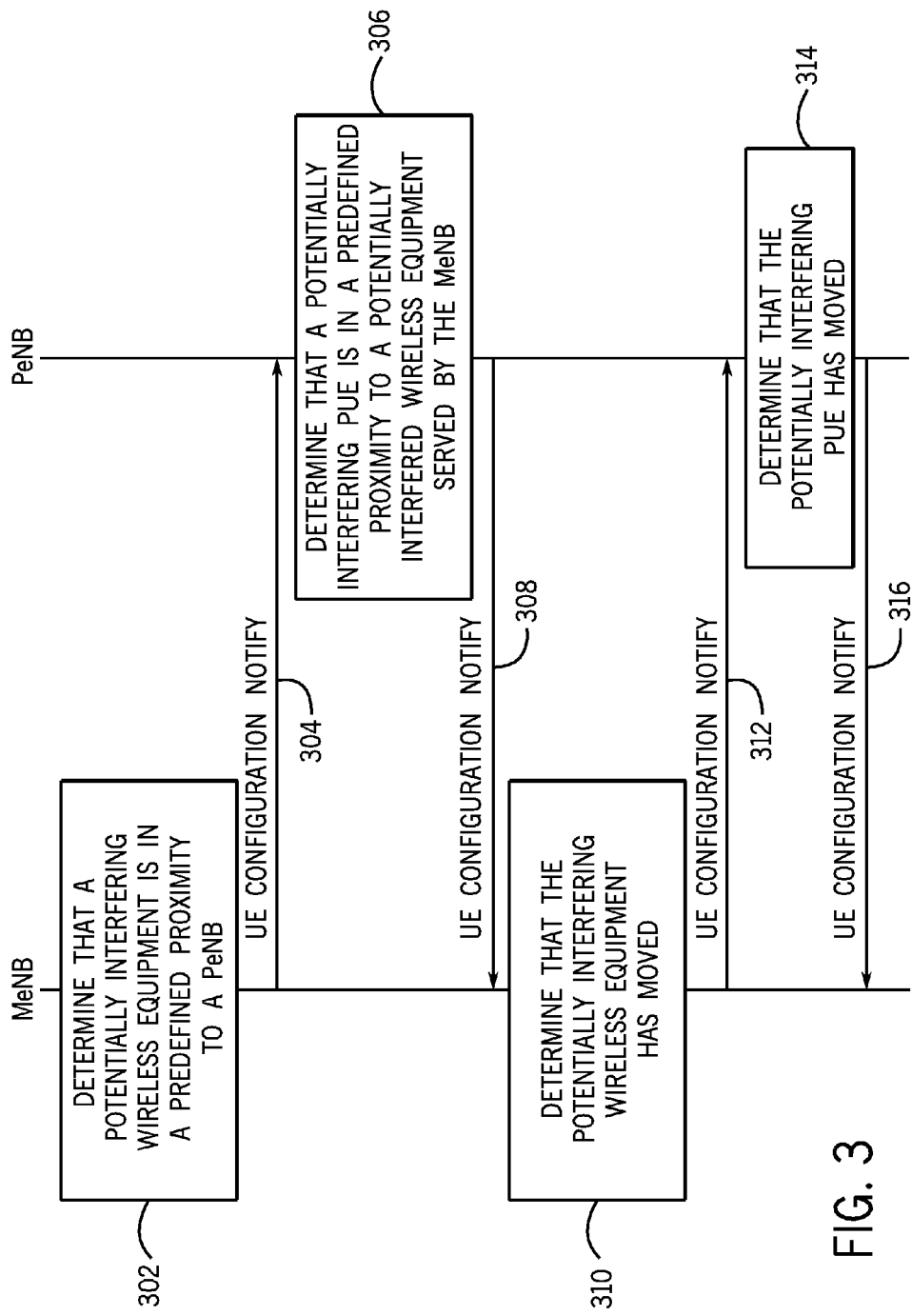
FIG. 3 is a message flow diagram of a process that illustrates various example triggers of a user equipment (UE) Configuration Notify message, in accordance with some implementations.

FIG. 3 is a message flow diagram of some example scenarios that may cause a UE Configuration Notify message to be exchanged between an MeNB and a PeNB. Note that FIG. 3 addresses just some of the possible interference scenarios. A similar process can be performed for other interference scenarios.

If an MeNB determines (at 302) that a potentially interfering wireless equipment served by the MeNB (MUE that performs uplink transmission to the MeNB, a D2D MUE, a MUE that performs uplink transmission to a relay node, or a relay node that performs uplink transmission to a donor MeNB) is in a predefined proximity to a PeNB, then the MeNB sends (at 304) a UE Configuration Notify message to the PeNB, where the message contains the wireless equipment specific configuration information.

If a PeNB determines (at 306) that a potentially interfering PUE is in a predefined proximity to a potentially interfered wireless equipment served by the MeNB (a D2D MUE or a MUE that performs uplink transmission to a relay node), then the PeNB sends (at 308) a UE Configuration Notify message to the MeNB, where the message sent at 308 contains the PUE specific configuration information. The MeNB further shares the information in 308 to the corresponding D2D MUE or to the corresponding relay node.

If the MeNB determines (at 310) that the potentially interfering wireless equipment served by the MeNB (MUE that performs uplink transmission to the MeNB, a D2D MUE, a MUE that performs uplink transmission to a relay node, or a relay node that performs uplink transmission to a donor MeNB) has moved such that the potentially interfering wireless equipment is no longer in the predefined proximity with the PeNB, then the MeNB sends (at 312) another UE Configuration Notify message to the PeNB to update the wireless equipment specific configuration.

If the PeNB determines (at 314) that the potentially interfering PUE has moved such that the PUE is no longer in the predefined proximity with the potentially interfered wireless equipment of the serving MeNB (MUE that performs uplink transmission to the MeNB, a D2D MUE or a MUE that performs uplink transmission to a relay node), then the PeNB sends (at 316) another UE Configuration Notify message to the MeNB to update the PUE specific configuration.

Monitoring Output of Potentially Interfering Wireless Equipment

Further details regarding the monitoring of an output (uplink transmitted information) of a potentially interfering wireless equipment are provided below. Such monitoring allows for a determination of whether the potentially interfering wireless equipment is in fact causing interference with the transmission of a potentially interfered wireless equipment.

As noted above, a first type of uplink transmitted information of a potentially interfering wireless equipment that can be monitored is a scheduling request (SR) sent by the potentially interfering wireless equipment. Alternatively, a second type of uplink transmitted information that can be monitored is the channel quality indicator (CQI) transmitted by the potentially interfering wireless equipment.

The SR is sent by a wireless equipment to indicate that the user equipment has data to transmit. A user equipment can send the SR in a physical uplink control channel (PUCCH), such as by using PUCCH format 1. A CQI report can be sent to indicate the quality of a wireless channel between the wireless equipment and an eNB, such as by using PUCCH format 2. More generally, there can be other control information, such as channel state information (CSI) or a reference signal, sent by a wireless equipment using a PUCCH, such as a PUCCH according to a format 1, 2, 2a, 2b, or 3 configuration.

In some examples, the SR sent by a potentially interfering UE can be monitored by a non-serving eNB, a D2D recipient MUE, or a relay node, for determining whether the potentially interfering UE will cause interference. Notice that the SR can be sent over PUCCH only when PUCCH is allocated for a UE. From the received SR power, the receiving entity (e.g. non-serving PeNB) can judge whether the sending UE will cause uplink interference. To enable monitoring of the SR, a serving eNB shares PUCCH resources allocated to a potentially interfering UE with a non-serving eNB that may be the subject of interference. SR monitoring can be useful for bursty traffic when the UE repeatedly switches between non-active and active transmission modes; an SR is sent each time the UE changes from non-active to active transmission mode, so that there are a relatively large numbers of SR that can be monitored for purposes of determining a potentially interfering wireless equipment will cause interference.

An SR is the latest uplink signal from a wireless equipment (e.g. UE or relay node) before the wireless equipment receives an uplink grant from an NB so that the wireless equipment can send uplink data over a physical uplink shared channel (PUSCH). As a result, an SR may reflect the latest uplink signal condition.

As noted above, an SR can be sent using PUCCH format 1 (which can specify a specific resource index mapping, the period of every nth frame, etc.). The PUCCH format 1 of a potentially interfering wireless equipment is shared between eNBs through the exchange of an X2 UE Configuration Notify message, as discussed above, such that monitoring of the SR can be performed for identifying whether a potentially interfering wireless equipment will cause interference. For example, an MeNB can share the PUCCH allocation of the potentially interfering MUE with a PeNB, D2D recipient MUE, or relay node, so that the PeNB, D2D recipient node, and relay node can monitor the SR from the MUE. Similarly, a PeNB can share the PUCCH allocation of the potentially interfering PUE with a non-serving PeNB, D2D recipient MUE, or relay node so that the non-serving PeNB, D2D recipient MUE, or relay node can monitor the SR from the PUE.

In D2D communications, it is possible that the D2D transmitting MUE sends an SR to the serving (and controlling) MeNB instead of directly transmitting the SR to the D2D recipient MUE, and the MeNB in turn sends an uplink grant to the D2D transmitting MUE and sends a corresponding notification to the D2D recipient MUE. In such implementations, the MeNB can share the PUCCH allocation for the D2D transmitting MUE with a D2D recipient MUE served by different MeNB, non-serving PeNB or relay node served by different MeNB that may be subject to interference. The D2D recipient MUE, PeNB, or relay node can then monitor the SR to indicate whether an upcoming data transmission will cause uplink interference.

In relay communications, an MUE sends an SR to a relay node, or a relay node sends an SR to a serving MeNB. The PUCCH allocation of both the MUE and the relay node is controlled by the serving MeNB; as a result, the serving MeNB can share the PUCCH allocation for the MUE and relay node with the following potentially interfered wireless equipment to allow such potentially interfered wireless equipment to monitor the SR of the relay node or the MUE that transmits to the relay node: a D2D recipient MUE served by different MeNB, PeNB, or another relay node served by different MeNB.

A CQI report can be sent from an MUE to its serving MeNB, from a relay node to its serving MeNB, from an MUE to its serving relay node, or from a PUE to its serving PeNB, if there is downlink traffic. Also, a CQI report can be sent from a D2D transmitting MUE to a D2D recipient MUE (that are performing D2D communication) if there is also traffic from the D2D recipient MUE sent to the D2D transmitting MUE. The CQI report can be sent using a PUCCH format in some examples. The CQI monitoring is useful if the traffic is not bursty and there is bi-directional traffic such that CQI reports are sent.

The PUCCH format of a specific wireless equipment can specify a specific resource element assignment, a radio network temporary identifier (RNTI), and so forth. To allow for monitoring of CQI, the PUCCH format of a specific wireless equipment is shared between eNBs through the exchange of an X2 UE Configuration Notify message.

Alternatively, instead of monitoring CQI or SR, the output of a potentially interfering equipment that can be monitored can include a sounding reference signal (SRS), a random access channel (RACH), and a demodulation reference signal (DMRS). An SRS can be used to facilitate frequency dependent scheduling. DMRS is used by a receiver for data reception. A RACH is used by a UE to obtain the attention of an eNB and/or to synchronize the UE's transmission with the eNB.

To allow for monitoring of an SRS for identifying whether a potentially interfering wireless equipment will cause interference, the SRS configuration (e.g. periodicity of the SRS, subframe used to carry the SRS, carrier/subcarrier used to carry the SRS, etc.) of the potentially interfering wireless equipment (UE or relay node) is shared by one eNB with another eNB using the X2 UE Configuration Notify message.

To allow for monitoring of DMRS for identifying whether a potentially interfering wireless equipment will cause interference, the DMRS configuration (e.g. whether the DMRS is transmitted together with uplink data in a PUSCH assigned to a given wireless equipment) of the potentially interfering wireless equipment is shared by one eNB with another eNB using the X2 UE Configuration Notify message.

To allow for monitoring of the RACH for identifying whether a potentially interfering wireless equipment will cause interference, a non-contention RACH preamble signature of the potentially interfering wireless equipment can be shared between eNBs using the exchange of X2 UE Configuration Notify message. This can provide more frequent updates to take into account the mobility of the potentially interfering wireless equipment. Alternatively, to facilitate interferer identification, the MeNB can intentionally assign a non-contention RACH preamble to a MUE that is potentially an interferer. Then the MeNB can notify a PeNB that is potentially the subject of interference about this assignment (subframe, preamble indexes, etc.), and the PeNB can measure the RACH transmission from the MUE. In this manner, the MeNB can trigger the interferer identification procedure intentionally. In a non-contention RACH transmission and retransmission(s), the initial transmission power and the power increase step may be specified for the purpose of uplink interference detection. The foregoing techniques can also be applied to the other interference scenarios.

In some implementations, an eNB serving a potentially interfering wireless equipment can instruct the non-serving eNB (that is subject to interference) to change the uplink transmitted information of the potentially interfering wireless equipment to monitor, based on one or more criteria, such as traffic characteristics. For example, once an MeNB (serving of a potentially interfering MUE) detects a relatively large buffer from the buffer status report (BSR) sent by the MUE (which indicates that the MUE has a relatively large amount of uplink data to send), the MeNB may instruct the PeNB, via an X2 message, to switch from monitoring SR to monitoring DMRS or CQI (assuming that there is significant downlink traffic in this session) to identity the interferer, since the large buffer will cause SR not to be repeatedly sent in the immediate future.

The following provides some examples of monitoring of uplink transmitted information from a potentially interfering wireless equipment to allow the monitoring equipment to determine whether the potentially interfering wireless equipment will cause interference.

A given MUE sends an SR or CQI to MeNB. A potentially interfered wireless equipment in a predefined proximity to the MUE (e.g. PeNB, a D2D recipient MUE served by a different MeNB, or a relay node served by different MeNB) can detect the SR or CQI of the given MUE and determine whether the given MUE will potentially cause uplink interference.

A D2D transmitting MUE can send an SR to the serving MeNB or can send a CQI to the D2D recipient MUE. A potentially interfered wireless equipment (e.g. a PeNB, a D2D recipient MUE served by a different MeNB, or a relay node served by a different MeNB) can detect the SR or CQI of the D2D transmitting MUE to determine whether the D2D transmitting MUE will cause uplink interference.

A given MUE attached to a relay node can transmit a SR or CQI to the relay node. A potentially interfered wireless equipment (e.g. a PeNB, a D2D recipient MUE served by a different MeNB, or another relay node served by a different serving MeNB) can detect the SR or CQI from the given MUE and determine whether the given MUE will cause uplink interference.

A PUE can send a SR or CQI to its serving PeNB. A potentially interfered wireless equipment (e.g. D2D MUE, or a relay node, or a different PeNB) can detect the SR or CQI from the PUE and determine whether the PUE will cause uplink interference.

A given relay node can send a SR or CQI to its serving MeNB. A potentially interfered wireless equipment (e.g. a PeNB, a D2D recipient MUE served by a different MeNB, another relay node served by a different MeNB) can detect the SR or CQI from the given relay node and determine whether the given relay node will cause uplink interference.

The foregoing detection scenarios are also applicable for cases where RACH, SRS or DMRS is monitored.

Mitigation Procedure Upon Determining Interfering and Interfered Equipment

Once an interfering wireless equipment and the interfered wireless equipment are identified, a mitigation procedure can be performed to mitigate the wireless interference. The mitigation can involve the coordination of eNBs associated with the interfering equipment and the interfered equipment. The coordination can be performed through a message, such as a message exchanged over the X2 interface from the interfered eNB to the eNB serving the interfering wireless equipment. In FIG. 2A, this message can include the interfering report sent at 208. Several interference mitigation techniques can be used, including an uplink Almost Blank Subframe (ABS) technique, a Carrier Based Enhanced Inter-Cell Interference Coordination (CBeICIC) technique, and an uplink Fractional Frequency Reuse (FFR) technique, as examples. These interference mitigation techniques are described further below.

In some examples, an interfering report message can include an interfering pattern as monitored on the SR, CQI, RACH, SRS, or DMRS. In addition, the interfering report message can also include the assigned uplink resources assigned to the wireless equipments served by interfered eNB. Additionally, in some implementations, the interfering report message can include an indication of which of multiple interference mitigation techniques (such as those listed above) to use.

Figure 4:
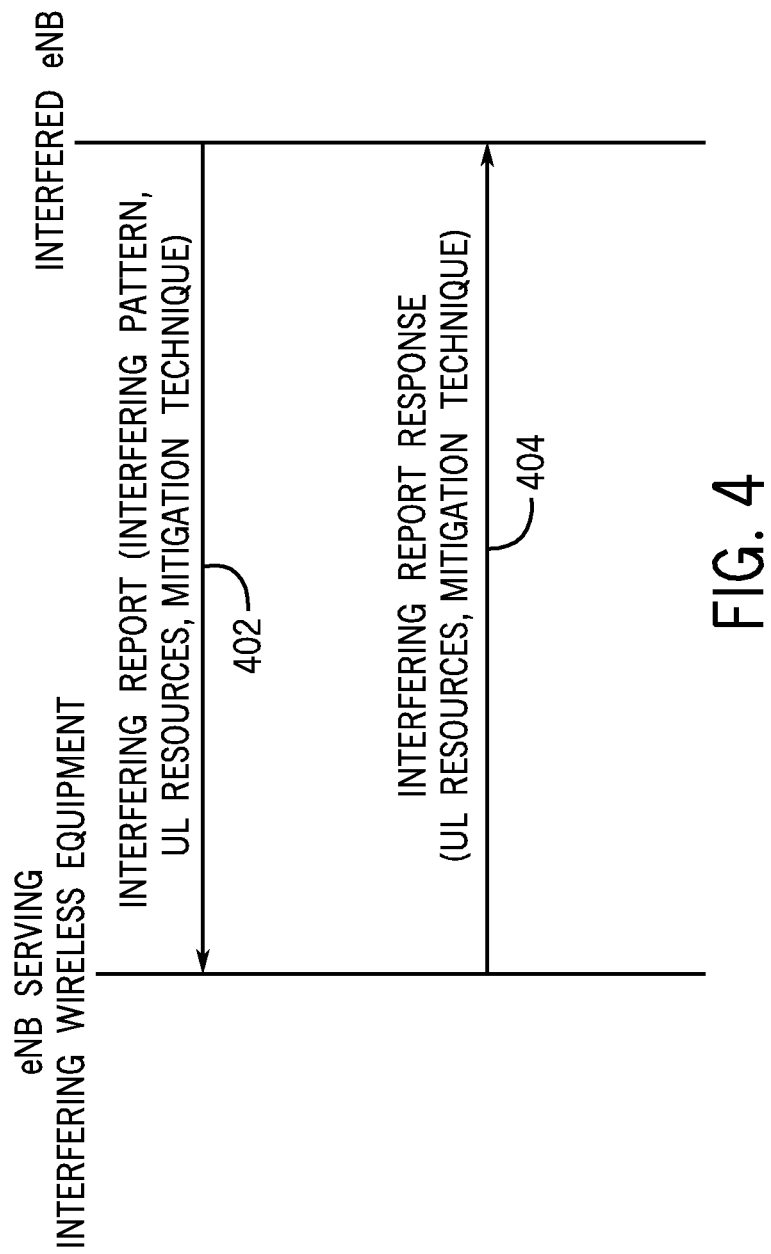
FIG. 4 is a message flow diagram of a process that includes an exchange of an interfering report and an interfering report response between wireless access network nodes, in accordance with some implementations.

FIG. 4 is a message flow diagram illustrating an interfered eNB sending (at 402) an interfering report message to an eNB serving the interfering wireless equipment. The eNB serving the interfering wireless equipment can send (at 404) an interfering report response to the interfered eNB, where the interfering report response can include the assigned uplink resources assigned to the interfering wireless equipment. The interfering report response can also include an indication of which of multiple interference mitigation techniques to use.

Uplink Almost Blank Subframe (ABS)

The uplink ABS technique is a time domain coordination technique that can be used for non-carrier aggregation (CA) configuration. Carrier aggregation allows multiple carriers to be aggregated. For example, according to LTE-A, up to five component carriers can be aggregated in a carrier aggregation. If each carrier has a bandwidth of 20 MHz, then the carrier aggregation that includes five component carriers can have a bandwidth of 100 MHz. Carrier aggregation allows for enhanced data communication throughput between a UE and an eNB.

With the uplink ABS technique according to some implementations, two eNBs (associated with respective interfering and interfered wireless equipments) coordinate an uplink grant so that the same uplink resources will not be simultaneously allocated to both the interfering wireless equipment and to any wireless equipment served by the interfered eNB. For example, an interfering MUE and the PUE served by the interfered PeNB will not be allocated same resources in the uplink grant. Similarly, as another example, an interfering PUE and the D2D transmitting MUE that performs a D2D transmission to the interfered D2D recipient MUE will not be allocated same resources in the uplink grant.

Resources that have been allocated to an interfering wireless equipment can be allocated as an uplink ABS (almost blank subframe) to the transmitting wireless equipment that transmits to the interfered receiving wireless equipment. Alternatively, if the uplink resources have already been granted to a transmitting wireless equipment that transmits to the interfered wireless equipment, the same uplink resources will be allocated as UL ABS to the interfering wireless equipment.

The coordination between eNBs to avoid reuse of the same uplink resources by the interfering wireless equipment and the transmitting wireless equipment that transmits to the interfered wireless equipment is accomplished by sharing uplink resources between the eNBs. For example, the MeNB that serves the interfering wireless equipment shares an identification of the uplink resources that have been granted to all of the MeNB's served wireless equipments to a PeNB that is in the predefined proximity to the interfering wireless equipments. Similarly, a PeNB serving the interfering PUE shares an identification of the uplink resources that have been granted to all of the PUE(s) served by the PeNB with a MeNB that serves the interfered wireless equipment.

Enhanced Inter-Cell Interference Coordination (CBeICIC)

The CBeICIC technique is a carrier domain coordination technique that can be used in scenarios where carrier aggregation (CA) is used. As noted above, a carrier aggregation includes multiple component carriers. One of the component carriers can be used as a primary carrier, while the remaining component carrier(s) of the carrier aggregation is (are) used as secondary carrier(s). A cell serving the UE on a primary carrier can be used as a primary cell, while a cell serving the UE on a secondary carrier can be used as a secondary cell. The primary cell is used by the UE for various functionalities that are not provided by a secondary cell. As examples, the functionalities of the primary cell can include the provision of system information from an eNB to the UE, mobility management, performance of semi-persistent scheduling (SPS) in which the eNB assigns a predefined amount of radio resources for communications with the UE, provision of a physical uplink control channel (PUCCH) that is used by the UE to transport signaling information, and so forth.

When carrier aggregation is used, the eNB serving the interfering wireless equipment receives an interfering report (such as at 208 in FIG. 2A) in a primary cell. The interfering report can include the monitored SR, CSI, CQI, RACH, SRS, or DMRS pattern that is indicative of interference. The interfering report can also include the resources granted to the interfered wireless equipment in the primary cell and the secondary cell(s) of the carrier aggregation. With the CBeICIC technique, to mitigate the interference, the eNB serving interfering wireless equipment may partly or completely move the PUSCH allocated to the interfering wireless equipment to a secondary cell, if the PUSCH is in the primary cell and can be moved. Moving the PUSCH to the secondary cell reduces the primary cell load, which can lead to reduction of uplink interference by the interfering wireless equipment. Note that the PUSCH can be moved to the secondary cell if it is determined that the secondary cell is not overloaded.

If the primary cell is still overloaded after PUSCH is moved to a secondary cell, or if PUSCH cannot be moved from a primary cell for whatever reason, then the primary cell for CA-capable UE can be moved to a different carrier.

Alternatively, the eNBs serving the respective interfering and interfered wireless equipments can coordinate the carrier aggregation allocated to each of the interfering or interfered wireless equipment so that the primary carrier (on which a primary cell is provided) for the interfering wireless equipment is different from the primary carrier for the interfered wireless equipment. The primary carrier for the interfering wireless equipment is a secondary carrier (on which a secondary cell is provided) of the interfered wireless equipment, while the primary carrier of the interfered wireless equipment is a secondary cell of the interfering wireless equipment. For example, coordination between the eNBs can cause assignment of f1 as the primary carrier and f2 as the secondary carrier of the interfering wireless equipment, and assignment of f2 as the primary carrier and f1 as the secondary carrier of the interfered wireless equipment.

If uplink interference occurs in f2, the interfering wireless equipment that uses f2 as the secondary carrier moves its secondary carrier to f3 (if available) or configures uplink ABS in f2 to mitigate uplink interference. Moving the secondary carrier to f3 has the effect of moving the secondary cell to a different carrier. If the uplink interference occurs in f1, the interfered wireless equipment that uses f1 as the secondary carrier moves its secondary carrier to f3 (if available) or configures uplink ABS in f1 to mitigate uplink interference.

Moving a primary cell to a different carrier is a more complex procedure than moving resources to and within a secondary cell. Thus, if possible, interference mitigation is performed by first moving a secondary cell to a different carrier.

Uplink Fractional Frequency Reuse (FFR)

The uplink FFR technique for mitigating uplink interference allows the same uplink resources to be allocated to an interfering wireless equipment and an interfered wireless equipment when they are not interfering with one another. The serving eNBs can coordinate the uplink grant so that the same uplink resources will not be simultaneously allocated to the interfering wireless equipment (located in an interfering area) and to any wireless equipment served by the interfered eNB. The same uplink resources, however, can be assigned to a non-interfering wireless equipment (located outside interfering area) or a non-interfered wireless equipment.

For example, the interfering MUE and the PUE served by the interfered PeNB, or an interfering PUE and the D2D transmitting MUE that transmits to an interfered D2D receiving MUE, will not be allocated same resources in the uplink grant.

With the uplink FFR technique, uplink resources that have been allocated to an interfering wireless equipment can be allocated to transmitting wireless equipments not served by the interfered eNB. For example, the uplink resources allocated to the interfering MUE can be allocated to a PUE not served by the interfered PeNB. Similarly, the uplink resources allocated to the PUE served by an interfered PeNB can be allocated to a non-interfering MUE outside the interfering area.

With the uplink ABS technique, uplink resources are basically unused by assigning as uplink ABS. With the uplink FFR technique, uplink resources assigned to an interfering wireless equipment can be reused by another wireless equipment under certain conditions (such as those above), tighter coordination is performed to assure that the uplink resource re-use does not create uplink interference.

With the uplink FFR technique, an eNB will not allocate uplink resources that have been assigned to an interfered wireless equipment (known from the interfering report) to any wireless equipment that is within a predefined proximity to the interfered wireless equipment. However, the same uplink resources can be allocated to another wireless equipment that is far (outside the predefined proximity) from the interfered wireless equipment.

A non-interfering wireless equipment is a wireless equipment for which SR or CSI or CQI or RACH or SRS or DMRS is not detected by the interfered eNB, since the theoretical interfering area itself is not easily defined due to radio propagation and fading characteristics. The decision whether a wireless equipment is interfering or not is based on the monitored SR or CSI or CQI or RACH or SRS or DMRS and not by the wireless equipment's location inside or outside a theoretical interfering area.

CBeICIC Flow

Figure 5:
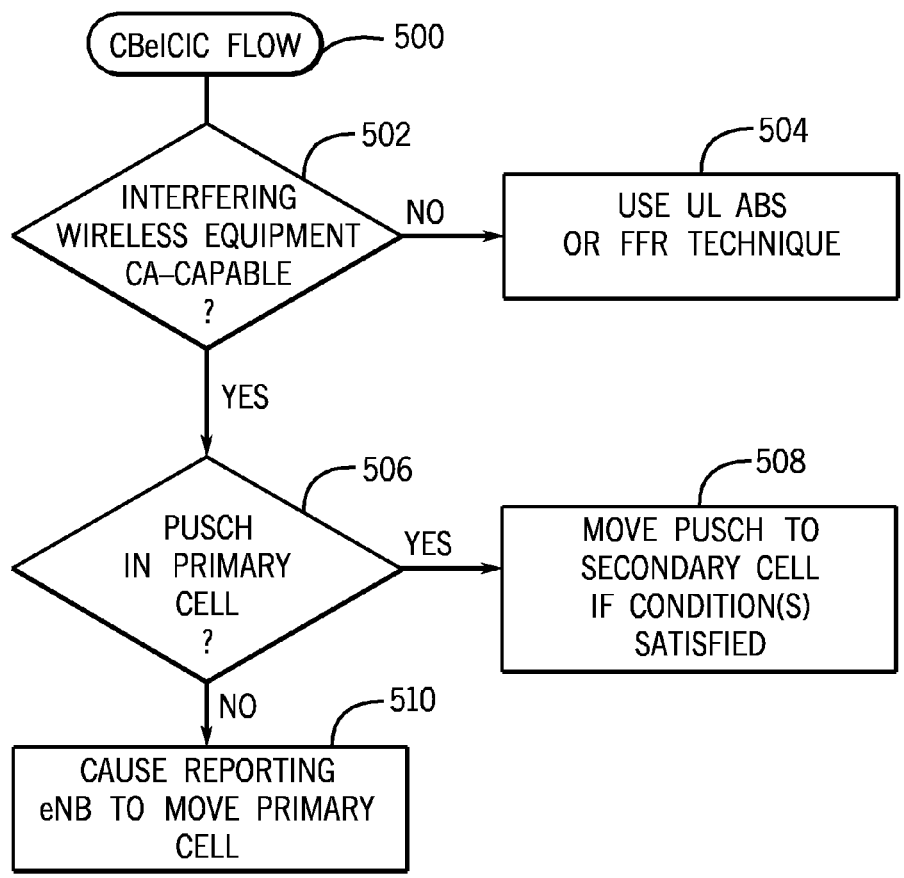
FIG. 5 is a flow diagram of a process of interference mitigation, according to further implementations.

FIG. 5 is a flow diagram of a process 500 of a flow using the CBeICIC technique, in accordance with some implementations. The process 500 can be performed by one or both of an interfered eNB and an eNB serving an interfering wireless equipment. The process 500 determines (at 502) if the interfering wireless equipment is CA-capable. If not, the process 500 uses (at 504) either the uplink ABS or FFR interference mitigation technique.

If the interfering wireless equipment is CA-capable, the process 500 determines (at 506) if the PUSCH allocated to the interfering wireless equipment is in the primary cell. If so, the process moves (at 508) the PUSCH to the secondary cell if the PUSCH can be moved, and provided the following conditions are satisfied:

the secondary cell of the interfering wireless equipment is not overloaded by the PUSCH move; and if the secondary cell overlaps with a secondary cell or primary cell of the interfered eNB, the overlapping cells are not overloaded by the PUSCH move.

If the process 500 determines (at 506) that the PUSCH is not in the primary cell, then the process 500 causes (at 508) the reporting eNB (that sent the interfering report message) to move the primary cell of the interfered wireless equipment. For example, the primary cell can be swapped with a least busy secondary cell. The moving of the primary cell (at 508) is performed if the following conditions are met:

if the secondary cell of the requesting eNB (which is requesting the reporting eNB to move its primary cell) overlaps with the new primary cell, the process 500 assures that the secondary cell of the requesting eNB is not overloaded by the primary cell move, which may lead to uplink interference; or if the primary cell of the requesting eNB overlaps with the new secondary cell, the process 500 assures that the new secondary cell is not overloaded due to the primary cell move.

System Architecture

Figure 6:
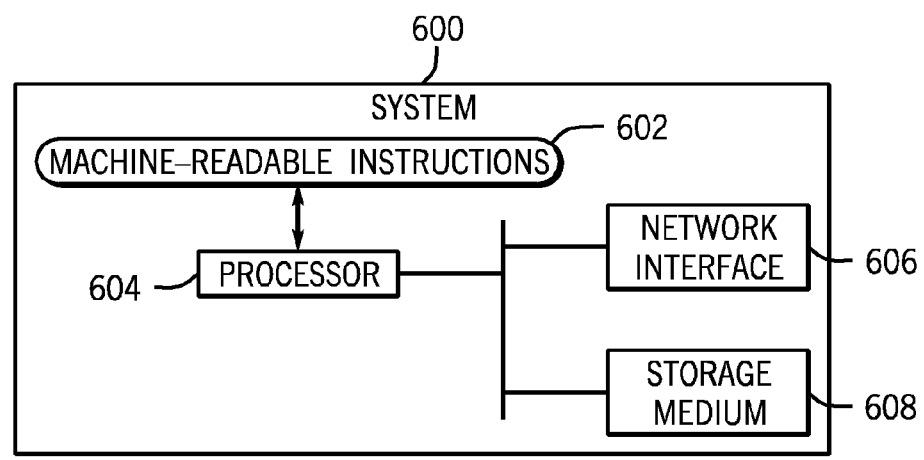
FIG. 6 is a block diagram of an example system that can incorporate some implementations.

FIG. 6 depicts an example system 600, which can be a UE, relay node, or eNB. The system 600 includes machine-readable instructions 602 executable on one or multiple processors 604. The system 600 further includes a network interface 604 to communicate over a link, and a storage medium (or storage media) 608 to store information. If the system 600 is an eNB, the network interface 604 can communicate over an X2 interface (or another interface) with another eNB. If the system 600 is a UE or relay node, then the network interface 604 is a wireless interface to communicate over a wireless link, either with an eNB, another UE, or a relay node.

A processor can include a microprocessor, microcontroller, processor module or subsystem, programmable integrated circuit, programmable gate array, or another control or computing device.

The storage medium (or storage media) 608 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
    determining, by a first wireless access network node, whether a first wireless equipment is potentially an interferer of wireless communication of a second wireless equipment in a domain of a second wireless access network node, wherein the first wireless equipment is in a domain of the first wireless access network node, and wherein the determining is based at least in part on whether the first wireless equipment is in a predefined proximity to the second wireless access network node or the second wireless equipment; and
    in response to determining that the first wireless equipment is potentially the interferer of the wireless communication of the second wireless equipment, sending, by the first wireless access network node to the second wireless access network node, configuration information relating to a physical uplink control channel (PUCCH) format used by the first wireless equipment, to allow the second wireless access network node or the second wireless equipment to detect an interference from the first wireless equipment and to initiate performance of an interference mitigation procedure with respect to the interference from the first wireless equipment.

2. A method comprising:
    determining, by a first wireless access network node, whether a first wireless equipment is potentially an interferer of wireless communication of a second wireless equipment in a domain of a second wireless access network node, wherein the first wireless equipment is in a domain of the first wireless access network node, and wherein the determining is based at least in part on whether the first wireless equipment is in a predefined proximity to the second wireless access network node or the second wireless equipment; and
    in response to determining that the first wireless equipment is potentially the interferer of the wireless communication of the second wireless equipment, sending, by the first wireless access network node, configuration information to the second wireless access network node to allow the second wireless access network node or the second wireless equipment to detect an interference from the first wireless equipment and to initiate performance of an interference mitigation procedure with respect to the interference from the first wireless equipment, wherein the first wireless equipment is a first user equipment that performs device-to-device (D2D) wireless communication to another user equipment in the domain of the first wireless access network node, wherein the D2D wireless communication interferes with the second wireless equipment that is a user equipment in the domain of the second wireless access network node, and
    wherein the configuration information relates to at least one control signaling characteristic of control signaling transmitted by the first wireless equipment, selected from among a control signal format, a signature or pattern of a control signal, and a type of information conveyed by a control signal.

3. The method of claim 1, wherein sending the configuration information allows the second wireless access network node to cause monitoring of at least one output of the first wireless equipment to detect the interference from the first wireless equipment.

4. The method of claim 3, wherein monitoring the at least one output comprises monitoring a control signal in a PUCCH according to the PUCCH format.

5. A method comprising:
    determining, by a first wireless access network node, whether a first wireless equipment is potentially an interferer of wireless communication of a second wireless equipment in a domain of a second wireless access network node, wherein the first wireless equipment is in a domain of the first wireless access network node, and wherein the determining is based at least in part on whether the first wireless equipment is in a predefined proximity to the second wireless access network node or the second wireless equipment; and
    in response to determining that the first wireless equipment is potentially the interferer of the wireless communication of the second wireless equipment, sending, by the first wireless access network node, configuration information to the second wireless access network node to allow the second wireless access network node or the second wireless equipment to detect an interference from the first wireless equipment and to initiate performance of an interference mitigation procedure with respect to the interference from the first wireless equipment, wherein the first or second wireless equipment is involved in a device-to-device (D2D) wireless communication or a communication of a relay node, and
    wherein the configuration information relates to at least one control signaling characteristic of control signaling transmitted by the first wireless equipment, selected from among a control signal format, a signature or pattern of a control signal, and a type of information conveyed by a control signal.

6. The method of claim 5, wherein the first wireless equipment is a first user equipment that performs wireless communication with the relay node in the domain of the first wireless access network node, wherein the wireless communication to the relay node interferes with the second wireless equipment that is a user equipment in the domain of the second wireless access network node.

7. The method of claim 5, wherein the first wireless equipment is the relay node that performs wireless communication with the first wireless access network node that interferes with the second wireless equipment that is a user equipment in the domain of the second wireless access network node.

8. The method of claim 1, wherein the first wireless equipment is a macro user equipment in the domain of the first wireless access network node, and the second wireless equipment is a pico user equipment in the domain of the second wireless access network node.

9. The method of claim 5, wherein the first wireless equipment is a user equipment in the domain of the first wireless access network node, and the second wireless equipment is a user equipment that performs the D2D wireless communication in the domain of the second wireless access network node.

10. The method of claim 1, wherein the first wireless equipment is a pico user equipment in the domain of the first wireless access network node, and the second wireless equipment is a macro user equipment that communicates with a relay node in the domain of the second wireless access network node.

11. The method of claim 1, wherein the first wireless equipment is a macro user equipment or a relay node in the domain of the first wireless access network node, and the second wireless equipment is one of a macro user equipment that communicates with a relay node and a macro user equipment that performs device-to-device communication in the domain of the second wireless access network node.

12. The method of claim 1, further comprising:
in response to the configuration information, causing, by the second wireless access network node or the second wireless equipment, monitoring of at least one output of the first wireless equipment to determine whether the first wireless equipment is an interferer with wireless communication of the second wireless equipment, wherein the monitoring is performed by the second wireless access network node, a user equipment, or a relay node.

13. The method of claim 1, further comprising:
receiving, by the first wireless access network node, information indicating that the first wireless equipment is an interferer; and
performing, by the first wireless access network node, an action to mitigate interference caused by the first wireless equipment.

14. The method of claim 13, wherein the action includes the first wireless access network node coordinating with the second wireless access network node to mitigate the interference caused by the first user equipment.

15. A first wireless access network node comprising:
a network interface to a second wireless access network node; and
at least one processor to:
determine whether a first wireless equipment served by the first wireless access network node is potentially an interferer of wireless communication of a second wireless equipment served by a second wireless access network node, wherein the determining is based at least in part on whether the first wireless equipment is in a predefined proximity to the second wireless access network node or the second wireless equipment; and
in response to determining that the first wireless equipment is potentially the interferer of the wireless communication of the second wireless equipment, send configuration information relating to a physical uplink control channel (PUCCH) format used by the first wireless equipment to the second wireless access network node to allow the second wireless access network node or the second wireless equipment to detect an interference from the first wireless equipment and to initiate performance of an interference mitigation procedure with respect to the interference from the first wireless equipment.

16. The first wireless access network node of claim 15, wherein the at least one processor is to further:
receive an interfering report from the second wireless access network node that the first wireless equipment is the interferer, wherein the interfering report is sent by the second wireless access network node based on monitoring of output of the first wireless equipment.

17. The first wireless access network node of claim 16, wherein the at least one processor is to further:
respond to the interfering report from the second wireless access network node by coordinating with the second wireless access network node to mitigate interference by the first wireless equipment.

18. The first wireless access network node of claim 17, wherein the interfering report includes information selected from among an interference pattern based on the monitoring, and an identification of uplink resources assigned by the second wireless access network node to at least one wireless equipment served by the second wireless access network node.

19. The first wireless access network node of claim 16, wherein the at least one processor is to further:
respond to the interfering report from the second wireless access network node by sending an interfering report response to the second wireless access network node, wherein the interfering report response includes an identification of uplink resources assigned by the first wireless access network node to at least one wireless equipment served by the first wireless access network node.

20. The method of claim 1, wherein the configuration information relates to the PUCCH format for transmission of a scheduling request (SR) or channel quality indicator (CQI) by the first wireless equipment, the method further comprising:
receiving, by the first wireless access network node, information indicating that the first wireless equipment is an interferer, the information responsive to monitoring of the SR or the CQI by the second wireless access network node.

21. The method of claim 5, wherein sending the configuration information allows the second wireless access network node to cause monitoring of at least one output of the first wireless equipment to detect an interference from the first wireless equipment, the at least one output comprises monitoring at least one selected from among a sounding reference signal (SRS), a random access channel (RACH), and a demodulation reference signal (DMRS).

22. The first wireless access network node of claim 15, wherein the configuration information relates to the PUCCH format for transmission of a scheduling request (SR) or channel quality indicator (CQI) by the first wireless equipment, the at least one processor can further:
receive information indicating that the first wireless equipment is an interferer, the information responsive to monitoring of the SR or the CQI by the second wireless access network node.

23. The method of claim 2, wherein the first user equipment is to perform the D2D wireless communication to the another user equipment by communicating directly with the another user equipment.

24. The method of claim 7, wherein the relay node is to relay communication of a user equipment with the first wireless access network node.

* * * * *